United States Patent
Blocksome et al.

(10) Patent No.: US 8,930,956 B2
(45) Date of Patent: Jan. 6, 2015

(54) UTILIZING A KERNEL ADMINISTRATION HARDWARE THREAD OF A MULTI-THREADED, MULTI-CORE COMPUTE NODE OF A PARALLEL COMPUTER

(75) Inventors: Michael A. Blocksome, Rochester, MN (US); Todd A. Inglett, Rochester, MN (US); Patrick J. McCarthy, Rochester, MN (US); Joseph D. Ratterman, Seattle, WA (US); Brian E. Smith, Knoxville, TN (US)

(73) Assignee: International Business Machines Corporation, Armonk, NY (US)

(*) Notice: Subject to any disclaimer, the term of this patent is extended or adjusted under 35 U.S.C. 154(b) by 316 days.

(21) Appl. No.: 13/569,275

(22) Filed: Aug. 8, 2012

(65) Prior Publication Data

US 2014/0047450 A1 Feb. 13, 2014

(51) Int. Cl.
*G06F 9/46* (2006.01)

(52) U.S. Cl.
USPC ............ 718/104; 718/100; 718/105; 718/108

(58) Field of Classification Search
None
See application file for complete search history.

(56) References Cited

U.S. PATENT DOCUMENTS

| | | | | |
|---|---|---|---|---|
| 5,692,192 A * | 11/1997 | Sudo | ............................. | 718/105 |
| 5,872,963 A * | 2/1999 | Bitar et al. | ..................... | 712/233 |
| 6,732,138 B1 * | 5/2004 | Browning et al. | ............ | 718/102 |
| 7,275,247 B2 * | 9/2007 | Mendoza et al. | ............. | 718/100 |
| 8,136,111 B2 * | 3/2012 | Mall et al. | ...................... | 718/102 |
| 8,321,874 B2 * | 11/2012 | Jayamohan et al. | .......... | 718/108 |
| 8,473,964 B2 * | 6/2013 | Jayamohan et al. | .......... | 719/310 |
| 8,484,648 B2 * | 7/2013 | Divirgilio et al. | ............. | 718/102 |
| 2005/0198080 A1 * | 9/2005 | Cai | ............................... | 707/201 |
| 2007/0101326 A1 * | 5/2007 | Cai et al. | ........................ | 718/100 |
| 2008/0184233 A1 * | 7/2008 | Norton et al. | .................. | 718/100 |
| 2009/0307708 A1 * | 12/2009 | Archer et al. | .................. | 718/108 |
| 2012/0291040 A1 * | 11/2012 | Breternitz et al. | ............ | 718/104 |

OTHER PUBLICATIONS

Gautier et al. "KAAPI: A thread scheduling runtime system for data flow computations on cluster of muti-processors", Jul. 28, 2007, Copyright 2007 ACM; Gautier_2007.pdf; pp. 15-23.*
Akkary, et al., "A Dynamic Multithreading Processor", MICRO 31: Proceedings of the 31st annual ACM/IEEE International Symposium on Microarchitecture, Dec. 1998, pp. 226-236, ACM, Los Alamitos, CA.
Eggers, et al., "Simultaneous Multithreading: A Platform for Next-Generation Processors", IEEE Micro; Sep. 1997, pp. 12-19, vol. 17, Issue 5, IEEE, USA.
Kreuzinger, et al., "Real-time Scheduling on Multithreaded Processors", In Proceedings of the Seventh IEEE International Conference on Real-Time Computing Systems and Applications, Dec. 2000, pp. 155-159, IEEE, USA.

* cited by examiner

*Primary Examiner* — Emerson Puente
*Assistant Examiner* — Hiren Patel
(74) *Attorney, Agent, or Firm* — Biggers Kennedy Lenart Spraggins LLP

(57) ABSTRACT

Methods, apparatuses, and computer program products for utilizing a kernel administration hardware thread of a multi-threaded, multi-core compute node of a parallel computer are provided. Embodiments include a kernel assigning a memory space of a hardware thread of an application processing core to a kernel administration hardware thread of a kernel processing core. A kernel administration hardware thread is configured to advance the hardware thread to a next memory space associated with the hardware thread in response to the assignment of the kernel administration hardware thread to the memory space of the hardware thread. Embodiments also include the kernel administration hardware thread executing an instruction within the assigned memory space.

14 Claims, 8 Drawing Sheets

UTILIZING A KERNEL ADMINISTRATION HARDWARE THREAD OF A MULTI-THREADED, MULTI-CORE COMPUTE NODE OF A PARALLEL COMPUTER

BACKGROUND OF THE INVENTION

1. Field of the Invention

The field of the invention is data processing, or, more specifically, methods, apparatuses, and computer program products for utilizing a kernel administration hardware thread of a multi-threaded, multi-core compute node of a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can be massively parallel and include many compute nodes within a computing system. Parallel computing is the partitioning or dividing of an algorithm into units, often called threads, which are simultaneously or concurrently executed on multiple processors. The intermediate results of these multiple threads are then combined into a final result. Thus, parallel computing is based on the idea that the process of solving a problem usually can be divided into smaller tasks, which may be carried out simultaneously with some coordination. Parallel computing is valuable because performing a large task by the parallel execution of smaller tasks can be faster than performing the large task via one serial (non-parallel) algorithm.

The parallel threads are often implemented on computer systems that include multiple processors and/or on multiple computer systems (often called compute nodes or simply nodes) that comprise processors, which run the parallel threads or local instances of global applications to accomplish tasks. The parallel thread or threads local to a particular node need a way to communicate with other parallel threads, which is often accomplished via a technique known as message passing. To ensure proper communication between various nodes, a standard known as the Message Passing Interface (MPI) has been developed.

Under the MPI standard, an MPI program consists of autonomous processes, executing their own code, which need not be identical. Typically, each process or application communicates via calls to MPI communication primitives, where each process executes in its own and shared memory. Such message passing allows the local processors comprising the node and applications running thereon (a thread or instance of the global application or process) to cooperate with each other. MPI is available on a wide variety of platforms, ranging from networks of workstations to massively parallel systems. Each message received by a compute node is eventually stored by the compute node. In a parallel computer with hundreds or thousands of compute nodes, where each compute node is continually storing thousands of messages, efficient storage of the messages plays an important role in the overall efficiency of the parallel computer.

SUMMARY OF THE INVENTION

Methods, apparatuses, and computer program products for utilizing a kernel administration hardware thread of a multi-threaded, multi-core compute node of a parallel computer are provided. Embodiments include a kernel assigning a memory space of a hardware thread of an application processing core to a kernel administration hardware thread of a kernel processing core. A kernel administration hardware thread is configured to advance the hardware thread to a next memory space associated with the hardware thread in response to the assignment of the kernel administration hardware thread to the memory space of the hardware thread. Embodiments also include the kernel administration hardware thread executing an instruction within the assigned memory space.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary methods, apparatuses, and computer program products for utilizing a kernel administration hardware thread of a multi-threaded, multi-core compute node of a parallel computer in accordance with the present invention are described with reference to the accompanying drawings, beginning with FIG. 1.

Figure 1:
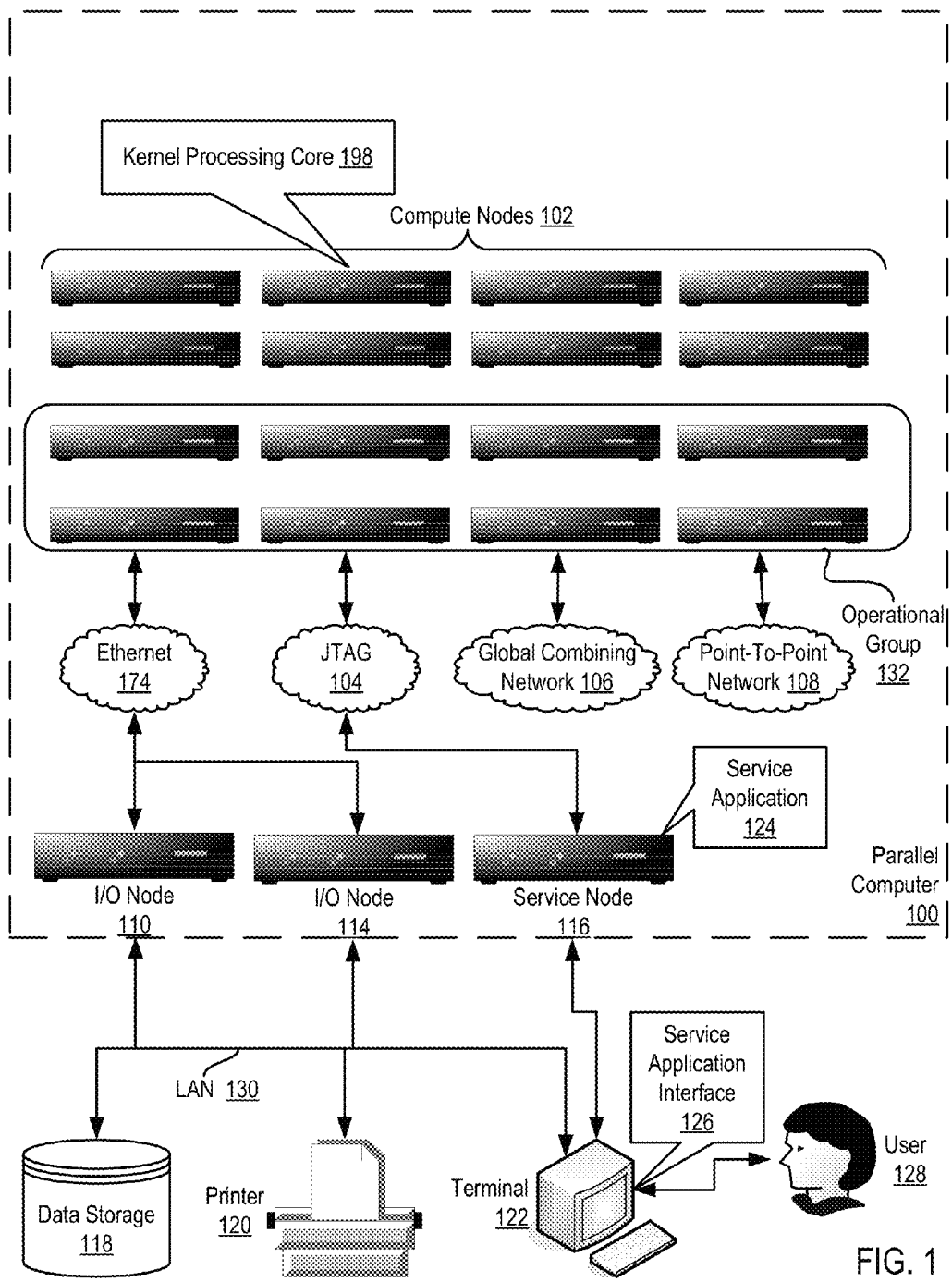
FIG. 1 illustrates an example system for utilizing a kernel administration hardware thread of a multi-threaded, multi-core compute node of a parallel computer according to embodiments of the present invention.

FIG. 1 illustrates an example system for utilizing a kernel administration hardware thread of a multi-threaded, multi-core compute node of a parallel computer according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102).

Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following predefined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for utilizing a kernel administration hardware thread of a multi-threaded, multi-core compute node of a parallel computer in accordance with embodiments of the present invention. Each compute node of the plurality of compute nodes (102) may include a kernel processing core (198) and a plurality of parallel application processing cores (not shown). A kernel processing core includes a plurality of kernel administration hardware threads and an application processing core includes a plurality of hardware threads. A kernel processing core and an application processing core may contain identical hardware including identical threads (kernel administration threads and hardware threads). That is, a kernel administration thread of a kernel processing core may be identical in hardware to a hardware thread of an application processing core. Although identical in hardware, the two types of threads differ in that a kernel administration thread is part of a kernel processing core, which is assigned to executing a kernel, and the hardware threads of an application processing core are assigned to executing instructions of an application that is not the kernel.

If the kernel does not use all of the kernel administration hardware threads at a particular time, then one or more of those 'available' kernel administration hardware threads may be used to process instructions assigned to the hardware threads of the application processing cores. For example, a kernel may assign a memory space of a hardware thread of an application processing core to a kernel administration hardware thread of an application processing core. The kernel administration hardware thread is configured to advance the hardware thread to a next memory space associated with the hardware thread in response to the assignment. The kernel administration hardware thread is also configured to execute an instruction within the assigned memory space. That is, instead of a kernel administration thread remaining inactive, a kernel uses the kernel administration thread to help process instructions previously assigned to a hardware thread of an application processing core. By utilizing available kernel administration hardware threads to process instructions for a hardware thread of an application processing core—instead of allowing the available kernel administration hardware threads to remain inactive, the resource utilization efficiency for the compute node is improved.

Utilizing a kernel administration hardware thread of a multi-threaded, multi-core compute node of a parallel computer according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters.

Figure 2:
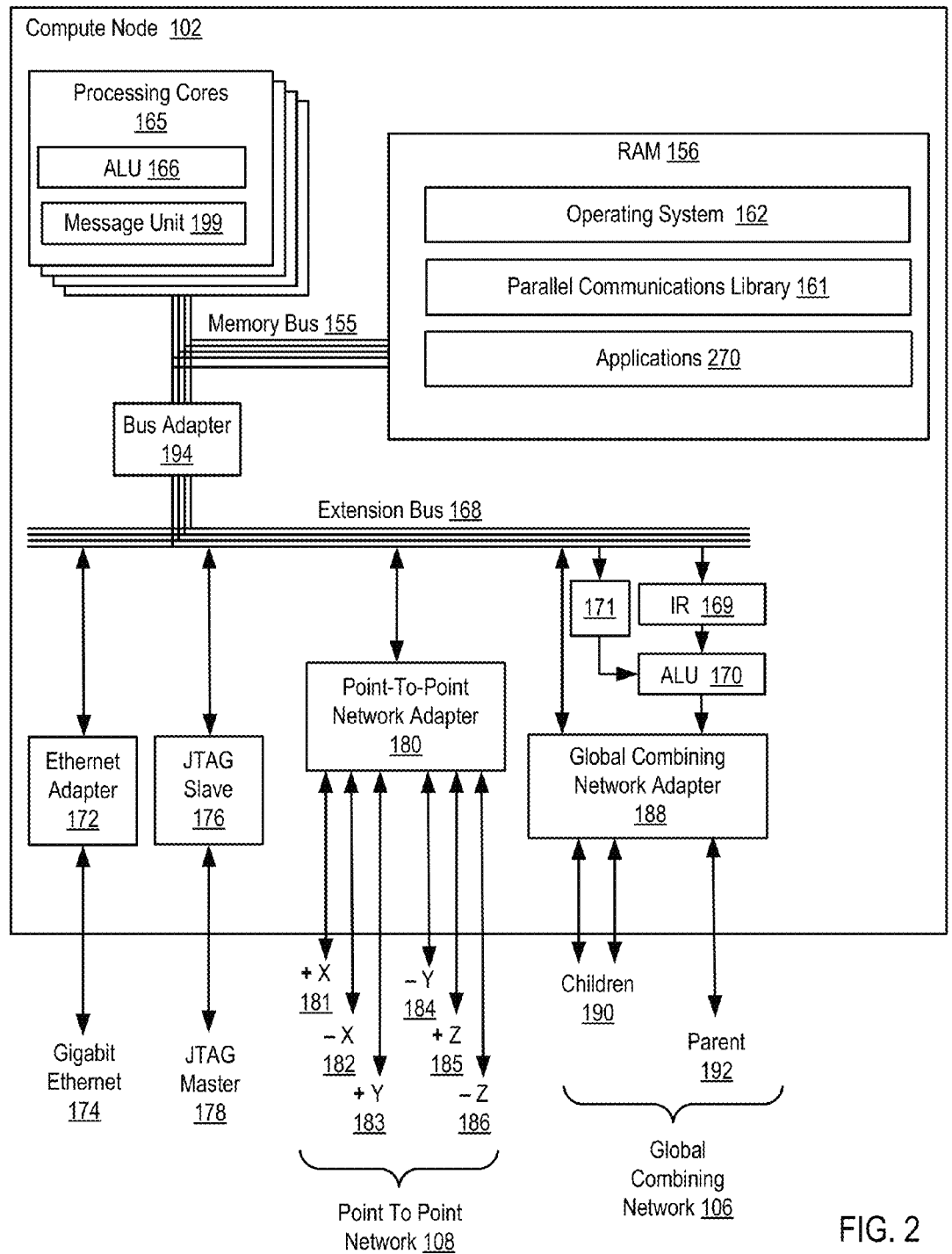
FIG. 2 sets forth a block diagram of an example multi-threaded, multi-core compute node of a parallel computer capable of utilizing a kernel administration hardware thread according to embodiments of the present invention.

For further explanation, FIG. 2 sets forth a block diagram of an example multi-threaded, multi-core compute node of a parallel computer capable of utilizing a kernel administration hardware thread according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node.

Stored in RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) are applications (270). Each application (270) in the example of FIG. 2 may be configured as one instance of a parallel application with other instances executing amongst a plurality of compute nodes organized into an operational group. That is, the applications (270) may include modules of computer program instructions that carry out parallel, user-level data processing using parallel algorithms.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus capable of utilizing a kernel administration hardware thread of a multi-threaded, multi-core compute node of a parallel computer include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems capable of utilizing a kernel administration hardware thread of a multi-threaded, multi-core compute node of a parallel computer according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple processing cores (165). At least one of the processing cores (165) is a kernel processing core with at least some of the remaining processing cores assigned as application processing cores. Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being performed in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
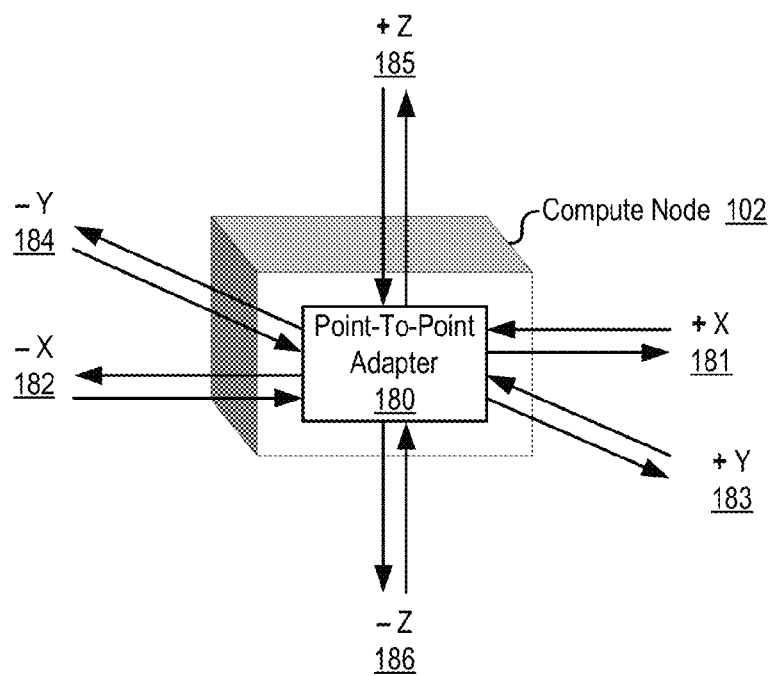
FIG. 3A sets forth a block diagram of an example Point-To-Point Adapter useful in systems for utilizing a kernel administration hardware thread of a multi-threaded, multi-core compute node of a parallel computer according to embodiments of the present invention.

For further explanation, FIG. 3A sets forth a block diagram of an example Point-To-Point Adapter (180) useful in systems capable of utilizing a kernel administration hardware thread of a multi-threaded, multi-core compute node of a parallel computer according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
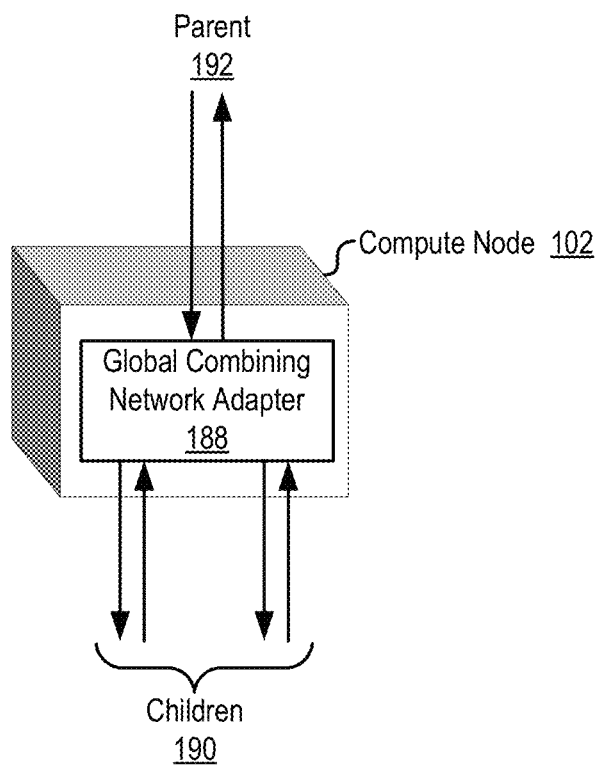
FIG. 3B sets forth a block diagram of an example Global Combining Network Adapter useful in systems for utilizing a kernel administration hardware thread of a multi-threaded, multi-core compute node of a parallel computer according to embodiments of the present invention.

For further explanation, FIG. 3B sets forth a block diagram of an example Global Combining Network Adapter (188) useful in systems capable of utilizing a kernel administration hardware thread of a multi-threaded, multi-core compute node of a parallel computer according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
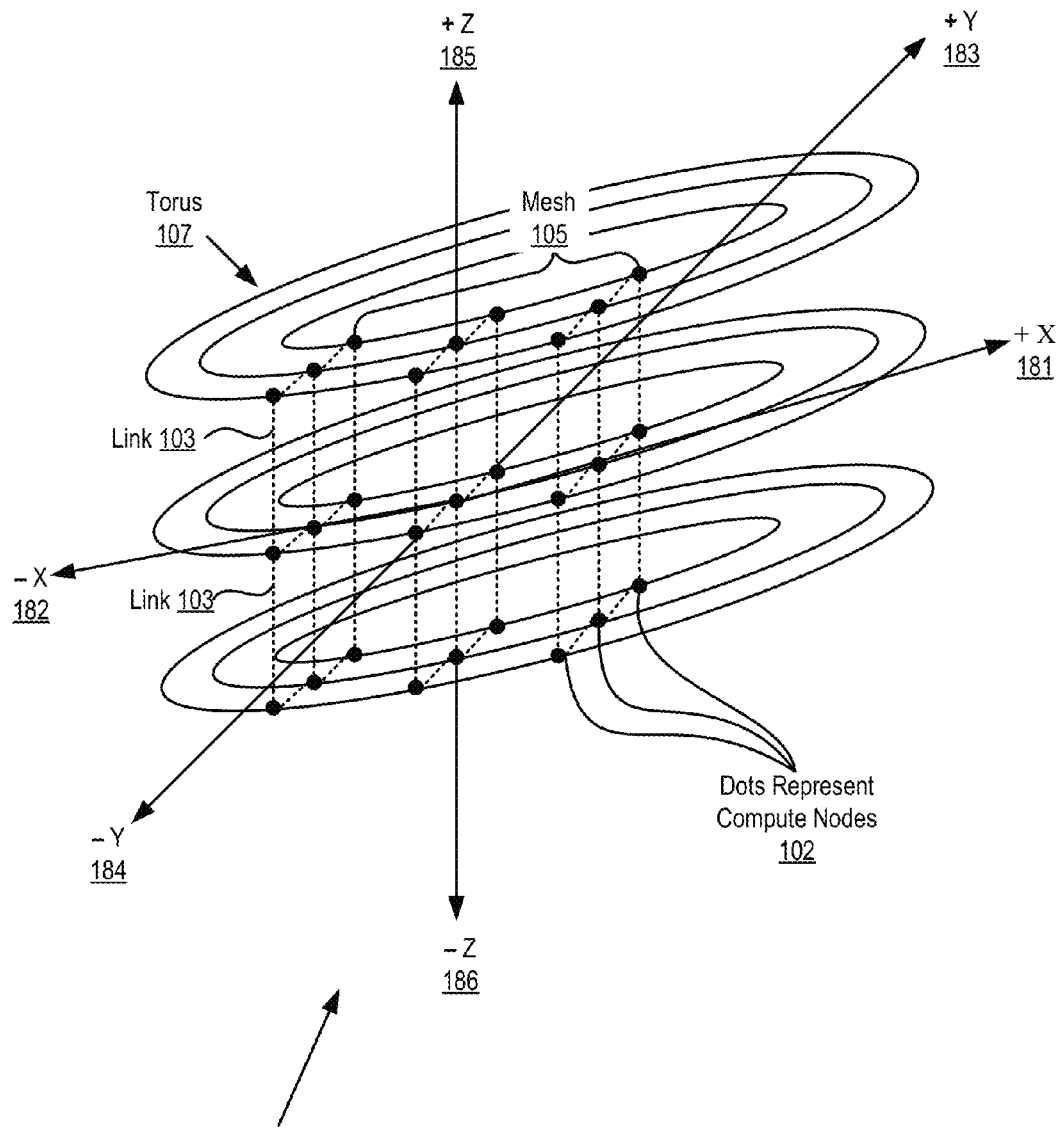
FIG. 4 sets forth a line drawing illustrating an example data communications network optimized for point-to-point operations useful in systems capable of utilizing a kernel administration hardware thread of a multi-threaded, multi-core compute node of a parallel computer according to embodiments of the present invention.

For further explanation, FIG. 4 sets forth a line drawing illustrating an example data communications network (108) optimized for point-to-point operations useful in systems capable of utilizing a kernel administration hardware thread of a multi-threaded, multi-core compute node of a parallel computer according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in utilizing a kernel administration hardware thread of a multi-threaded, multi-core compute node of a parallel computer in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in utilizing a kernel administration hardware thread of a multi-threaded, multi-core compute node of a parallel computer in accordance with embodiments of the present invention may in fact be implemented in two dimensions, four dimensions, five dimensions, and so on. Several supercomputers now use five dimensional mesh or torus networks, including, for example, IBM's Blue Gene Q™.

Figure 5:
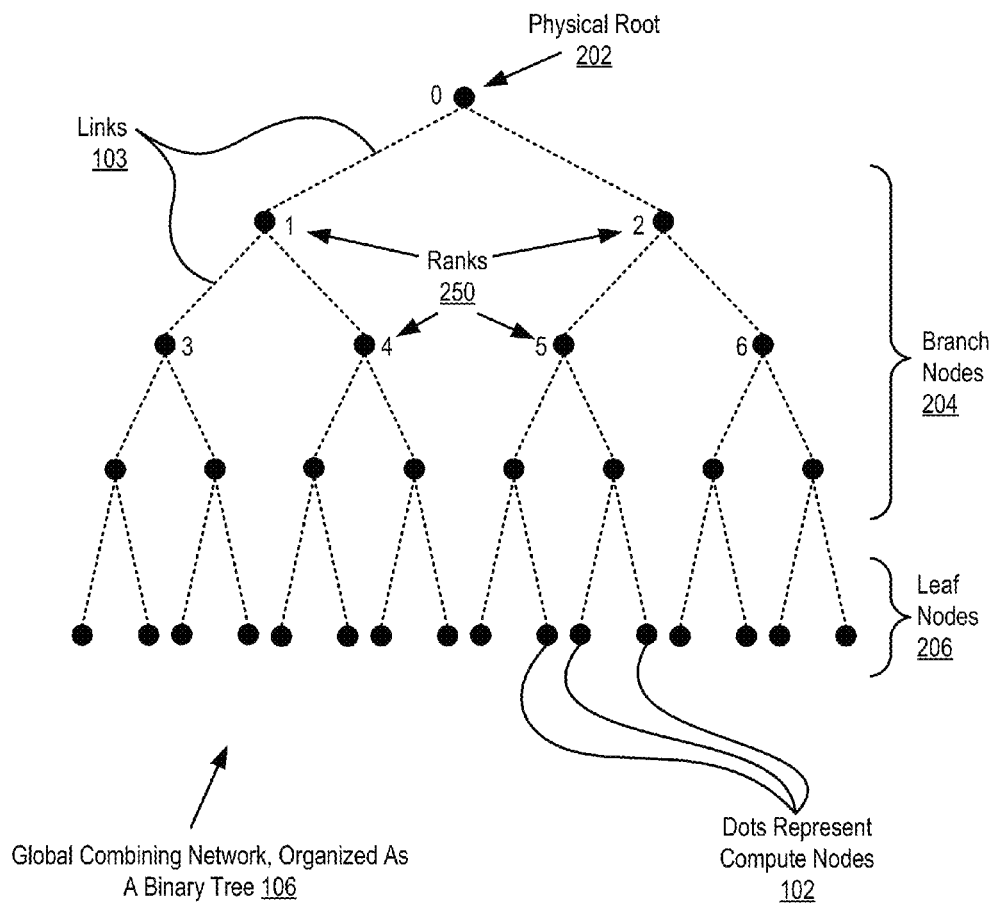
FIG. 5 sets forth a line drawing illustrating an example global combining network useful in systems capable of utilizing a kernel administration hardware thread of a multi-threaded, multi-core compute node of a parallel computer according to embodiments of the present invention.

For further explanation, FIG. 5 sets forth a line drawing illustrating an example global combining network (106) useful in systems capable of utilizing a kernel administration hardware thread of a multi-threaded, multi-core compute node of a parallel computer according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in utilizing a kernel administration hardware thread of a multi-threaded, multi-core compute node of a parallel computer in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
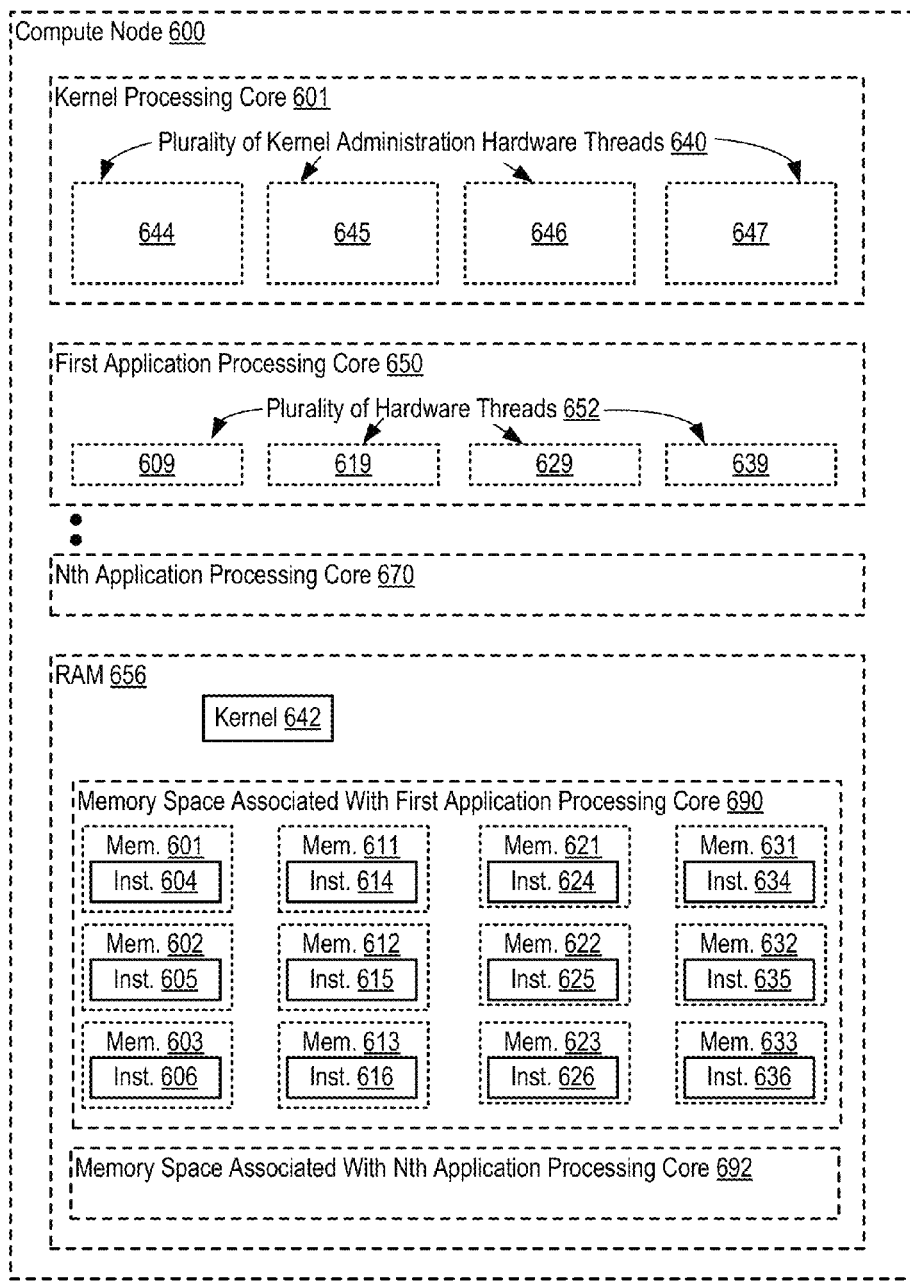
FIG. 6 sets forth a block diagram of another example multi-threaded, multi-core compute node of a parallel computer capable of utilizing a kernel administration hardware thread according to embodiments of the present invention.

For further explanation, FIG. 6 sets forth a block diagram of another example multi-threaded, multi-core compute node (600) of a parallel computer capable of utilizing a kernel administration hardware thread according to embodiments of the present invention. The compute node (600) of FIG. 6 includes a kernel processing core (601), a first application processing core (650), and a Nth application processing core (670), where 'N' is any integer. Readers of skill in the art will realize that the compute node (600) may include any number of kernel processing cores and application processing cores. For example, in a particular configuration, each compute node in a parallel computer may include one kernel processing core and sixteen application processing cores.

The kernel processing core (601) comprises a plurality of kernel administration hardware threads (640) including a first kernel administration hardware thread (644), a second kernel administration hardware thread (645), a third kernel administration hardware thread (646), and a fourth kernel administration hardware thread (647). The first application processing core (650) includes a plurality of hardware threads (652) including a first hardware thread (609), a second hardware thread (619), a third hardware thread (629), and a fourth hardware thread (639).

The compute node (600) of FIG. 6 also includes random access memory (RAM) (656). In the example of FIG. 6, the RAM (656) is used to store a kernel (647) and other applications and instructions for execution by the processing cores. The RAM (156) of FIG. 6 includes a first memory space (690) associated with the first application processing core (650) and a Nth memory space (692) associated with the Nth application processing core (692). The first memory space (690) includes sets of memory spaces corresponding to each hardware thread of the first application processing core (650). For example, a first set of memory spaces comprising memory spaces (601-603) having instructions (604-606) may correspond to the first hardware thread (609) and a second set of memory spaces comprising memory spaces (611-613) having instructions (614-616) may correspond to the second hardware thread (619). In this example, a third set of memory spaces comprising memory spaces (621-623) having instructions (624-626) may correspond to the third hardware thread (629) and a fourth set of memory spaces comprising memory spaces (631-633) having instructions (634-636) may correspond to the fourth hardware thread (639) of the first application processing core (690). Readers of skill in the art will realize that each hardware thread may have any number of corresponding memory spaces and instructions stored within.

Figure 7:
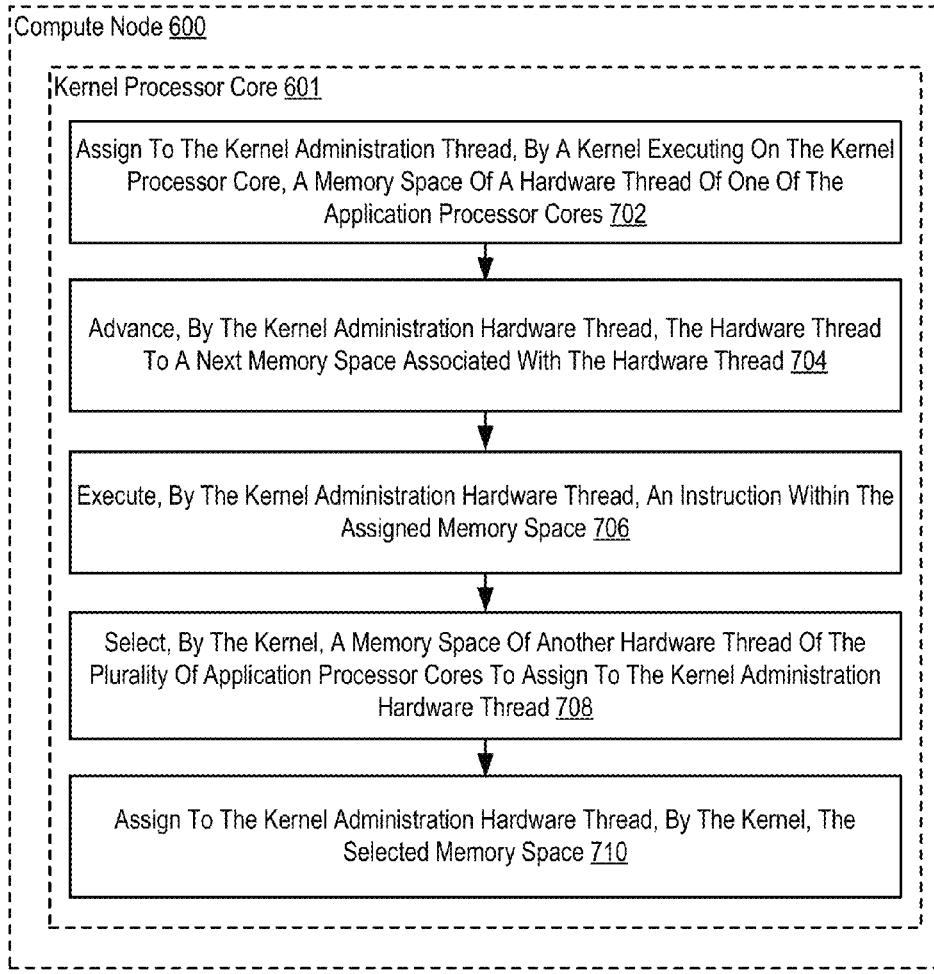
FIG. 7 sets forth a flow chart illustrating an exemplary method for utilizing a kernel administration hardware thread of a multi-threaded, multi-core compute node of a parallel computer according to embodiments of the present invention.

For further explanation, FIG. 7 sets forth a flow chart illustrating an exemplary method for utilizing a kernel administration hardware thread of a multi-threaded, multi-core compute node of a parallel computer according to embodiments of the present invention. For the sake of simplicity, the method of FIG. 7 is explained using the example compute node (600) of FIG. 6.

The method of FIG. 7 includes a kernel (647) assigning (702) a memory space (602) of a hardware thread (609) of one of the application processing cores (650) to a kernel administration hardware thread (645) of a kernel processing core (601). Each hardware thread of an application processing core is assigned its own memory space and is unaware of the memory spaces belonging to the other threads. The kernel (642), however, knows the address of each memory space of every hardware thread of the compute node. The kernel (642) may have its own dedicated memory space as well as mappings of the memory space of each hardware thread for each process for each of the application processing cores. Assigning (702) a memory space (602) of a hardware thread (609) to a kernel administration hardware thread (644-647) may be carried out by identifying an address of a memory space of a hardware thread of an application processing core that is not being used to execute an instruction. As part of assigning (702) a memory space (602), the kernel (642) may provide the identified address of the memory space to the kernel administration hardware thread. For example, if the hardware thread (609) is executing instruction (604) in memory space (601), the kernel (642) may assign a kernel administration hardware thread, such as the second kernel administration hardware thread (645), to execute the instruction (605) in the memory space (602).

The method of FIG. 7 also includes the kernel administration hardware thread advancing (704) the hardware thread (609) to a next memory space (603) associated with the hardware thread (609) in response to the assignment of the kernel administration hardware thread (645) to the memory space (602) of the hardware thread (609). Advancing (704) the hardware thread (609) to a next memory space (603) may be carried out by updating a register such that the hardware thread (609) does not execute the instruction within the assigned memory space and instead executes the instruction in the next memory space. The hardware thread of an application processing core may be 'advanced' without advancing code corresponding to an instruction that the application processing core is currently executing. That is, advancing by the kernel administration hardware thread does not disrupt the hardware thread of the application processing core that the kernel administration hardware thread is helping. For example, if the kernel administration hardware thread is assigned memory space (602) then the hardware thread (609) may be advanced to memory space (603) to execute instruction (606).

The method of FIG. 7 includes the kernel administration hardware thread (644) executing (706) an instruction (605) within the assigned memory space (602). Executing (706) an instruction (605) within the assigned memory space (602) may be carried out by retrieving an instruction from the assigned memory space and performing a corresponding operation in accordance with the retrieved instruction.

The method of FIG. 7 also includes the kernel (647) selecting (708) a memory space (612) of another hardware thread (619) to assign to the kernel administration hardware thread (645) in response to the kernel administration hardware thread (644) completing execution of the instruction (605) within the assigned memory space (602). Selecting (708) a memory space (612) of another hardware thread (619) to assign to the kernel administration hardware thread (645) may be carried out in an asynchronously, predetermined order of the hardware threads of the plurality of application processing cores. For example, the kernel may select, in a round robin pattern, each hardware thread. The predetermined order may include selecting each hardware thread from a rotation of application processing cores such that a memory space of one hardware thread from each application processing core is selected before a memory space of an addition hardware thread of any one application processing core is selected.

The method of FIG. 7 includes the kernel (642) assigning (710) the selected memory space (612) to the kernel administration hardware thread (645). Assigning (710) the selected memory space (612) may be carried out by identifying an address of the selected memory space and proving the identified address to the kernel administration hardware thread. Readers of skill in the art will realize that the method of FIG. 7 may be applied concurrently to multiple available kernel administration hardware threads such that each available kernel administration hardware thread may be concurrently assigned by the kernel to a memory space of a different hardware thread of the same or a different application processing core.

Exemplary embodiments of the present invention are described largely in the context of a fully functional computer system for utilizing a kernel administration hardware thread of a multi-threaded, multi-core compute node of a parallel computer. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of utilizing a kernel administration hardware thread of a multi-threaded, multi-core compute node of a parallel computer, the compute node comprising a kernel processing core and a plurality of parallel application processing cores, the kernel processing core comprising a plurality of kernel administration hardware threads, each application processing core comprising a plurality of hardware threads, wherein the plurality of kernel administration hardware threads and the plurality of hardware threads are implemented using identical hardware, the method comprising:
    assigning to the kernel administration hardware thread when the kernel administration hardware thread is not being utilized at a particular time, by a kernel executing on the kernel processing core, a memory space of a hardware thread of one of the application processing cores;
    in response to the assignment of the kernel administration hardware thread to the memory space of the hardware thread of one of the application processing cores, advancing, by the kernel administration hardware thread, the hardware thread to a next memory space associated with the hardware thread, wherein the advancing of the hardware thread to the next memory space is carried out by updating a register value such that the hardware thread does not execute within the assigned memory space and instead executes next instruction within the next memory space; and
    wherein the hardware thread of the one of the application processing cores is advanced without advancing code corresponding to an instruction that the one of the application processing cores is currently executing so that the hardware thread of the one of the application processing cores is not disrupted; and
    executing, by the kernel administration hardware thread, an instruction previously assigned to be executed by the hardware thread within the assigned memory space.

2. The method of claim 1 further comprising:
    in response to the kernel administration hardware thread completing execution of the instruction previously assigned to be executed by the hardware thread within the assigned memory space, selecting, by the kernel, a memory space of another hardware thread of the plurality of application processing cores to assign to the kernel administration hardware thread; and
    assigning to the kernel administration hardware thread, by the kernel, the selected memory space of another hardware thread.

3. The method of claim 2, wherein selecting, by the kernel, the memory space of another hardware thread to assign to the kernel administration hardware thread is carried out asynchronously, in a predetermined order of the hardware threads of the plurality of application processing cores.

4. The method of claim 1, wherein the kernel processing core comprises:
    at least one kernel administration hardware thread dedicated to executing the kernel; and
    a plurality of kernel administration hardware threads that are available for executing instructions within memory spaces associated with the hardware threads of the plurality of application processing cores.

5. The method of claim 4, wherein each of the kernel administration hardware threads is concurrently assigned by the kernel to a memory space of a different application processing core.

6. An apparatus for utilizing a kernel administration hardware thread of a multi-threaded, multi-core compute node of a parallel computer, the compute node comprising a kernel processing core and a plurality of parallel application processing cores, the kernel processing core comprising a plurality of kernel administration hardware threads, each application processing core comprising a plurality of hardware threads, wherein the plurality of kernel administration hardware threads and the plurality of hardware threads are implemented using identical hardware, the apparatus comprising a computer processor and a computer memory operatively coupled to the computer processor, the computer memory having disposed within it computer program instructions that when executed by the computer processor cause the apparatus to carry out the steps of:
    assigning to the kernel administration hardware thread when the kernel administration hardware thread is not being utilized at a particular time, by a kernel executing on the kernel processing core, a memory space of a hardware thread of one of the application processing cores;
    in response to the assignment of the kernel administration hardware thread to the memory space of the hardware thread of one of the application processing cores, advancing, by the kernel administration hardware thread, the hardware thread to a next memory space associated with the hardware thread, wherein the advancing of the hardware thread to the next memory space is carried out by updating a register value such that the hardware thread does not execute within the assigned memory space and instead executes next instruction within the next memory space; and
    wherein the hardware thread of the one of the application processing cores is advanced without advancing code corresponding to an instruction that the one of the application processing cores is currently executing so that the hardware thread of the one of the application processing cores is not disrupted; and executing, by the kernel administration hardware thread, an instruction previously assigned to be executed by the hardware thread within the assigned memory space.

7. The apparatus of claim 6 further comprising computer program instructions that when executed by the computer processor cause the apparatus to carry out the steps of:

in response to the kernel administration hardware thread completing execution of the instruction previously assigned to be executed by the hardware thread within the assigned memory space, selecting, by the kernel, a memory space of another hardware thread of the plurality of application processing cores to assign to the kernel administration hardware thread; and assigning to the kernel administration hardware thread, by the kernel, the selected memory space of another hardware thread.

8. The apparatus of claim 7, wherein selecting, by the kernel, the memory space of another hardware thread of the plurality of application processing cores to assign to the kernel administration hardware thread is carried out asynchronously, in a predetermined order of the hardware threads of the plurality of application processing cores.

9. The apparatus of claim 6, wherein the kernel processing core comprises:

at least one kernel administration hardware thread dedicated to executing the kernel; and a plurality of kernel administration hardware threads that are available for executing instructions within memory spaces associated with the hardware threads of the plurality of application processing cores.

10. The apparatus of claim 9, wherein each of the kernel administration hardware threads is concurrently assigned by the kernel to a memory space of a different application processing core.

11. A computer program product embodied in a computer readable storage medium, wherein the computer readable storage medium is not a signal, for utilizing a kernel administration hardware thread of a multi-threaded, multi-core compute node of a parallel computer, the compute node comprising a kernel processing core and a plurality of parallel application processing cores, the kernel processing core comprising a plurality of kernel administration hardware threads, each application processing core comprising a plurality of hardware threads, wherein the plurality of kernel administration hardware threads and the plurality of hardware threads are implemented using identical hardware, the computer program product disposed upon a computer readable medium, the computer program product comprising computer program instructions that when executed cause a computer to carry out the steps of:

assigning to the kernel administration hardware thread when the kernel administration hardware thread is not being utilized at a particular time, by a kernel executing on the kernel processing core, a memory space of a hardware thread of one of the application processing cores;

in response to the assignment of the kernel administration hardware thread to the memory space of the hardware thread of one of the application processing cores, advancing, by the kernel administration hardware thread, the hardware thread to a next memory space associated with the hardware thread, wherein the advancing of the hardware thread to the next memory space is carried out by updating a register value such that the hardware thread does not execute within the assigned memory space and instead executes next instruction within the next memory space; and wherein the hardware thread of the one of the application processing cores is advanced without advancing code corresponding to an instruction that the one of the application processing cores is currently executing so that the hardware thread of the one of the application processing cores is not disrupted; and executing, by the kernel administration hardware thread, an instruction previously assigned to be executed by the hardware thread within the assigned memory space.

12. The computer program product of claim 11 further comprising computer program instructions that when executed cause a computer to carry out the steps of:

in response to the kernel administration hardware thread completing execution of the instruction previously assigned to be executed by the hardware thread within the assigned memory space, selecting, by the kernel, a memory space of another hardware thread of the plurality of application processing cores to assign to the kernel administration hardware thread; and assigning to the kernel administration hardware thread, by the kernel, the selected memory space.

13. The computer program product of claim 12, wherein selecting, by the kernel, the memory space of another hardware thread of the plurality of application processing cores to assign to the kernel administration hardware thread is carried out asynchronously, in a predetermined order of the hardware threads of the plurality of application processing cores.

14. The computer program product of claim 11, wherein the kernel processing core comprises:

at least one kernel administration hardware thread dedicated to executing the kernel; and a plurality of kernel administration hardware threads that are available for executing instructions within memory spaces associated with the hardware threads of the plurality of application processing cores.

\* \* \* \* \*